April 26, 1949.　　　T. BACKUS　　　2,468,155
PROPELLER SHAFT CLUTCH AND CONTROL ASSEMBLY
Filed Aug. 5, 1944　　　3 Sheets-Sheet 1
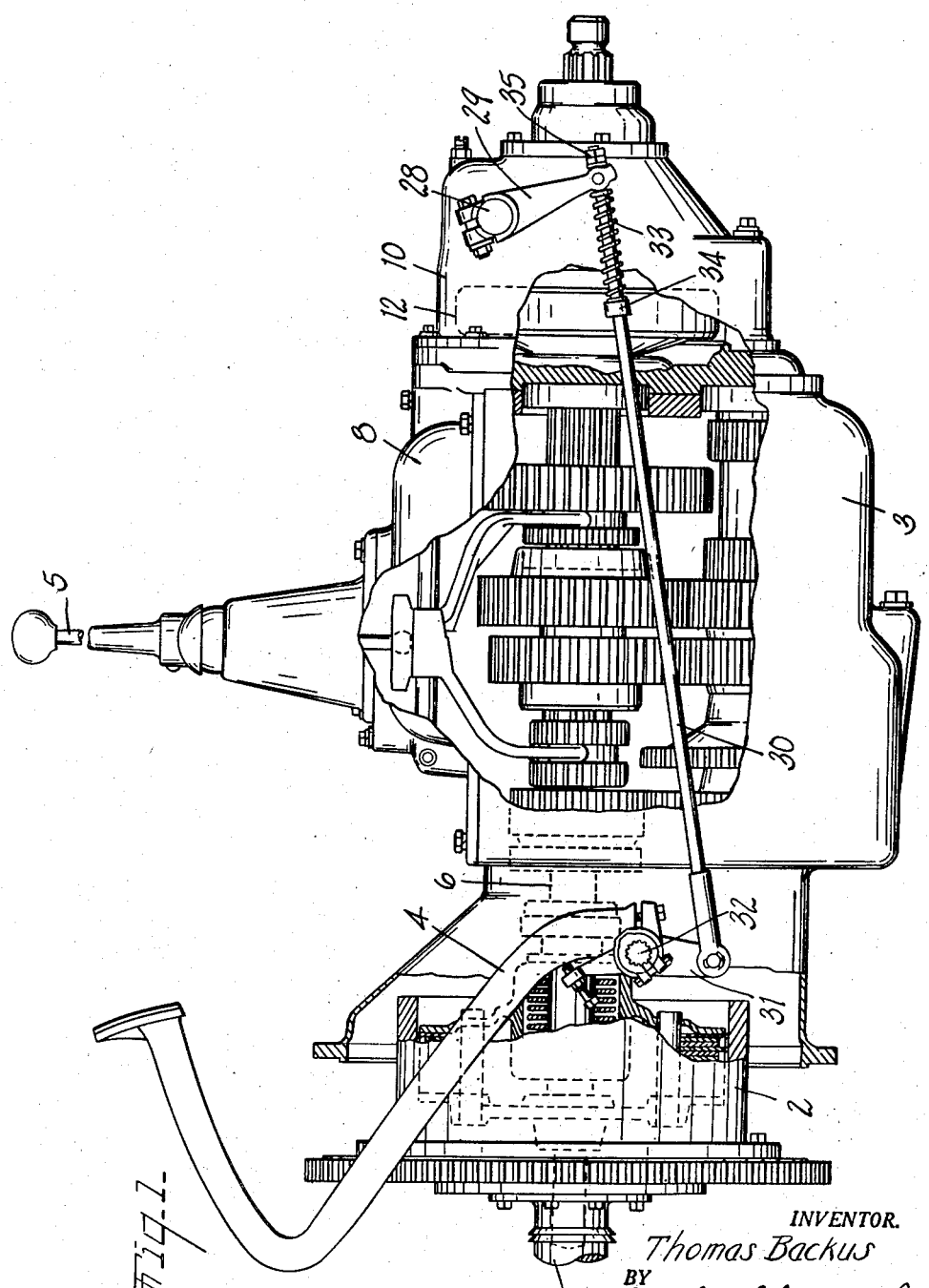
INVENTOR.
Thomas Backus
BY
Earl D. Chappell
ATTORNEYS.

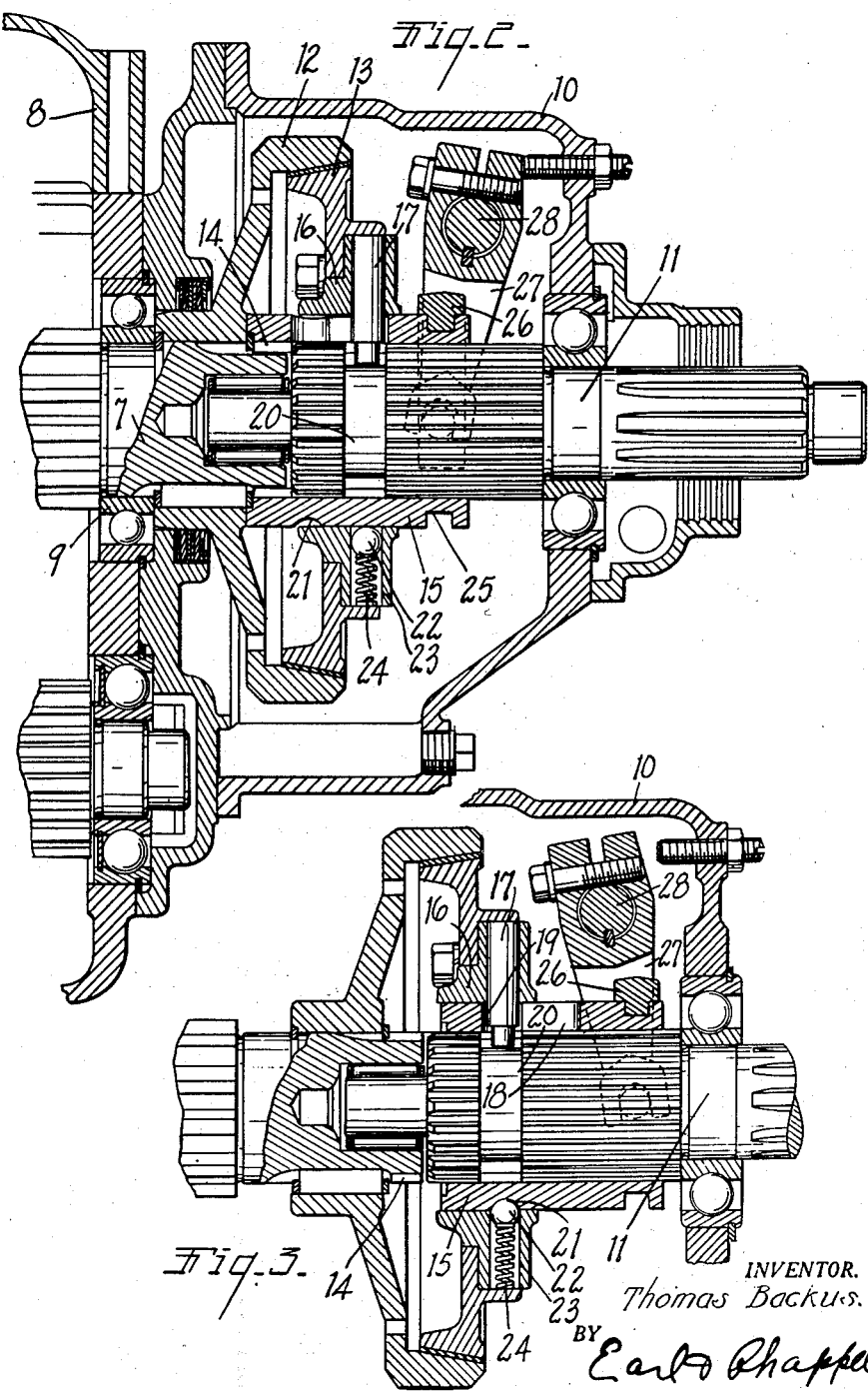

April 26, 1949. T. BACKUS 2,468,155
PROPELLER SHAFT CLUTCH AND CONTROL ASSEMBLY
Filed Aug. 5, 1944 3 Sheets-Sheet 3

INVENTOR.
Thomas Backus.
BY Earl F. Chappell
ATTORNEYS.

Patented Apr. 26, 1949

2,468,155

UNITED STATES PATENT OFFICE 2,468,155

PROPELLER SHAFT CLUTCH AND CONTROL ASSEMBLY

Thomas Backus, Peoria, Ill., assignor to Fuller Manufacturing Company, Kalamazoo, Mich.

Application August 5, 1944, Serial No. 548,250

10 Claims. (Cl. 74—340)

This invention relates to improvements in propeller shaft clutch and control assembly.

The main objects of this invention are:

First, to provide a propeller shaft clutch and control assembly well adapted for use in transmitting heavy loads as, for example, on trucks and the like.

Second, to provide an assembly of this class which may be operated with little effort on the part of the operator and one in which the propeller or driven shaft is automaticaly synchronized with the driving or power shaft for engagement of the positive elements of the clutch.

Third, to provide a transmission assembly including a clutch between the variable speed transmission unit and the propeller or driven shaft which clutch is operatively connected to the main clutch disposed in advance of the variable speed transmission unit.

Objects pertaining to details and economies of the invention will definitely appear from the description to follow. The invention is defined in the claims.

A structure which embodies the feaures of the invention is clearly illustrated in the accompanying drawing, in which:

Fig. 1 is a fragmentary side elevation of a transmission and clutch assembly embodying the features of my invention, certain parts being broken away and other parts partially in section to better disclose certain structural details.

Fig. 2 is an enlarged fragmentary view mainly in longitudinal section of the auxiliary clutch unit associated with the output shaft of the main transmission for connecting such shaft to the propeller or driven shaft.

Fig. 3 is a fragmentary view partially in section of certain parts shown in Fig. 2 with the parts in disengaged position.

Figure 4:
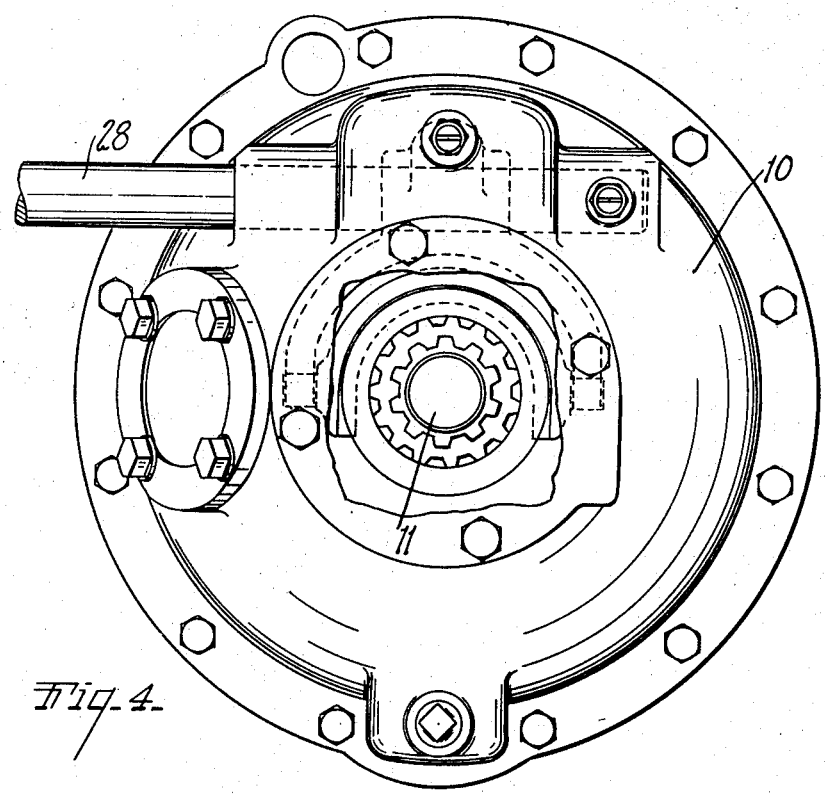
Fig. 4 is an end elevation of the auxiliary or synchronizing clutch with the casing and shifter rockshaft partially broken away.
Figure 5:
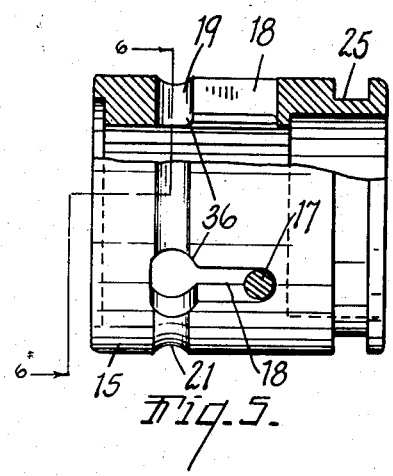
Fig. 5 is an enlarged fragmentary view partially in section of the shiftable jaw clutch element.
Figure 6:
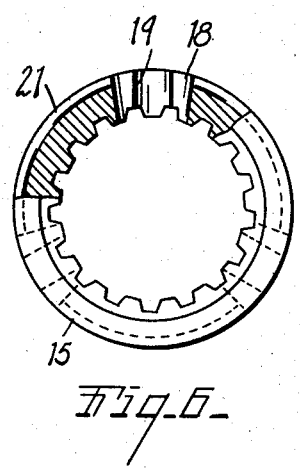
Fig. 6 is an end fragmentary view partially in section on line 6—6 of Fig. 5.

In the accompanying drawing I have illustrated my invention as embodied in a transmission assembly for motor vehicles. While it is highly desirable and particularly designed for use on trucks, the invention has wide application, it being particularly desirable where heavy torque loads are to be transmitted.

Referring to the drawing, I designates the power shaft and 2 the control clutch interposed between the power shaft and the variable speed transmission 3. For convenience I designate the clutch 2 as the main clutch. The clutch illustrated is of the friction disk type but as its details form no part of this invention I do not further describe the same herein. This clutch is controlled by the foot pedal 4. The transmission 3 is of the variable speed multiple gear reversing type controlled by the shift lever 5. The input or driving shaft of the transmission unit is shown by dotted lines at 6. The output or driven shaft 7 of the transmission unit projects through the rear end of the transmission housing 8 and is supported therein by the bearing 9. The housing 10 of the auxiliary clutch is mounted on the rear end of the transmission housing. As the details of the variable speed transmission may be widely varied and form no part of the present invention I do not describe in detail the transmission unit illustrated.

The propeller or output shaft 11 of the auxiliary clutch is alined with the output shaft 7 of the transmission, which output shaft is the driving shaft of the auxiliary clutch. The cone clutch member 12 is keyed to the shaft 7 to rotate therewith and is the driving element for the coacting friction clutch element 13. The shaft 7 has spline-like clutch jaws of the jaw clutch member 14 at its rear end. The coacting sleeve-like driven clutch member 15 is slidably mounted on and has splined engagement with the output shaft 11 and, when in engaged position as shown in Fig. 2, coacts with the jaws of the jaw clutch member 14 of the shaft 7 to provide a direct drive connection for the shafts 7 and 11. The friction clutch member 13 is carried by the sleeve 16 slidable on the sleeve-like clutch member 15. This supporting sleeve 16 is provided with a plurality of radially arranged pins 17 which project through slots 18 having enlargements 19 at their forward ends. The inner ends of these pins project into the annular groove 20 in the shaft 11, the pins coacting with the edges of the groove and serving to limit the sliding movement of the friction clutch member carrying sleeve on the sleeve or clutch member 15.

The sleeve-like jaw clutch member 15 is provided with an annular groove 21 which is engaged by the balls 22 arranged in radial bores 23 provided therefor in the friction clutch carrier sleeve 16, the balls being biased by the springs 24. In Fig. 3 the clutch member 15 is shown in retracted position, in which position the balls are in engagement with the groove.

The jaw clutch member 15 is grooved at 25 to receive the shifting yoke 26 which is engaged by the forked arm 27 on the rockshaft 28. This rockshaft has an arm 29 on its outer end connected by the link 30 to an arm 31 on the shaft 32 of the actuating lever 4. The link 30 is yieldably connected to the arm 29 by means of the thrust spring 33, the forward end of which engages the abutment collar 34 on the link and the rear end engages the arm 29. The abutment or thrust member 35 engages the rear side of the arm 29. It will therefore be noted that the thrust spring 33 is arranged to store power in the event the load on the driving jaw clutch member 14 and coacting driven jaw clutch member 15 is such as to prevent disengagement thereof prior to the full disengagement of the main clutch, the loaded spring then acting to disengage the jaw clutch members.

In operation, upon releasing the main clutch through its control lever, the sleeve or jaw clutch member 15 of the auxiliary clutch is disengaged and retracted to a position shown in Fig. 3 in which the balls 22 engage in the groove 21, the balls in effect serving as yielding detents for retaining the clutch member 15 in this retracted position. In this position the enlarged or widened ends 19 of the slots 18 are alined with the pins 17. Upon engaging the main clutch, stress is applied to the clutch sleeve 15 to move it forwardly to engaged position. In this movement the ball detents cause the friction clutch carrier sleeve 16 to move in a forward direction, bringing the friction clutch members 12 and 13 into coacting engagement. In the event the speeds of the shafts 7 and 11 are not synchronized the cone clutch member 13 rotates upon the member 15 to one end of the slot enlargements 19. As pressure is applied by the control connections described while engaging the main clutch to secure further forward movement of the clutch 15, the beveled or cammed surfaces 36 cause additional pressure on the cone clutch, resulting in the synchronizing of the shafts. When this takes place the pins slip into the elongated portions of the slots, thereby releasing the forward pressure on the cone clutch member 13 and permitting the jaw clutch member 15 to shift to completely engaged position. The spring pressed balls 22 being yieldingly lockingly engaged in the annular groove 21 of the driven friction clutch carrier 16, during the initial forward clutching movement of the driven jaw clutch member 15, facilitates frictional engagement of the friction clutch members 12 and 13 and jaw clutch engagement of the jaw clutch members 14 and 15, before the final clutch engagement of the main clutch 2. This sequence of operation in which the auxiliary clutch back of the transmission is engaged before the main clutch in front of the transmission is engaged, puts the work of final engagement of the operating load on the front or main clutch. This becomes particularly important when it is realized that the rear clutch carries the motor torque multiplied by the transmission ratio, whereas the front clutch carries only the motor torque.

In the event the driving load on the jaw clutch members is such as to prevent rearward axial movement of the member 15 during the disengagement of the main clutch, the spring 33 becomes compressed or power is stored up therein until such time as the main clutch is fully disengaged, when the load on the auxiliary jaw clutch member is instantly released and the loaded spring 13 shifts the propeller shaft clutch to fully disengaged position.

In the operation of trucks and heavy motor vehicles on highways a wide variety of conditions are met when it is necessary to shift gears, such varying conditions for example as arise on up and down grades and varying grades. With down grade conditions the propeller shaft frequently becomes the power or input shaft, and with the types of transmissions commonly used it is difficult and sometimes almost impossible to shift gears. This invention effectively overcomes many of these difficulties.

I have illustrated and described my invention in a highly practical embodiment thereof. I have not attempted to illustrate or describe other embodiments which I contemplate as it is believed this disclosure will enable those skilled in the art to embody or adapt my invention as may be desired.

Having thus described my invention what I claim as new and desire to secure by Letters Patent is:

1. A transmission assembly comprising a main clutch provided with an operating lever, a transmission unit controlled by said main clutch and including a housing and an output shaft, an auxiliary clutch housing mounted on the rear end of said transmission unit housing and into which said output shaft projects, said output shaft having a driving jaw clutch member at its rear end, a second output shaft alined with said first output shaft, a cone friction clutch member rotatable with said first output shaft, a sleeve-like driven jaw clutch member splined to said second output shaft to coact with said driving jaw clutch member, said driven jaw clutch member having longitudinal slots therein with enlargements at their front ends, a driven friction clutch member coacting with said cone clutch member, a carrier sleeve for said driven friction clutch member slidable upon said driven jaw clutch member for limited movement thereon, said carrier sleeve benig provided with radial pins engaging said slots in said driven jaw clutch member, said second output shaft having a peripheral groove into which the inner ends of said pins project, the pins and grove constituting coacting stops limiting the rearward movement of the carrier sleeve, said driven jaw clutch member having an annular groove therein, said carrier sleeve having a plurality of spring pressed balls engaging said groove when the driven jaw clutch member is in retracted position, said enlargements of said slots permitting limited rotative movement of said carrier sleeve when the driven jaw clutch member is in its retracted position, a shifting means for said driven jaw clutch member including a rockshaft provided with an arm, and a link connected to said lever having a spring thrust connection to said arm for retracting said driven jaw clutch member and a positive connection thereto for engaging said jaw clutch members prior to engagement of said main clutch, said spring pressed balls being releasably, retainingly engaged within said annular groove of the driven jaw clutch member during the initial forward clutching movement of said driven jaw clutch member to cause frictional engagement of said friction clutch members and facilitate engagement of said jaw clutch members.

2. A transmission assembly comprising a main clutch provided with an operating lever, a transmission unit controlled by said main clutch and including a housing and an output shaft, an auxiliary clutch housing mounted on the rear end of said transmission unit housing and into which said output shaft projects, said output shaft having a driving jaw clutch member at its rear end, a second output shaft alined with said first output shaft, a cone friction clutch member rotatable with said first output shaft a sleeve-like driven jaw clutch member splined to said second output shaft to coact with said driving jaw clutch member, said driven jaw clutch member having longitudinal slots therein with enlargements at their front ends, a driven friction clutch member coacting with said cone clutch member, a carrier sleeve for said driven friction clutch member slidable upon said driven jaw clutch member, said carrier sleeve being provided with radial pins engaging said slots in said driven jaw clutch member, said second output shaft having a peripheral groove into which the inner ends of said pins project, the pins and groove constituting coacting stops limiting the rearward movement of the carrier sleeve, said driven jaw clutch member having an annular groove therein, said carrier sleeve having a plurality of spring pressed balls engaging said groove when the driven jaw clutch member is in retracted position, said enlargements of said slots permitting limited rotative movement of said carrier sleeve when the driven jaw clutch member is in its retracted position, and a one way yielding one way positive operating connection for said operating lever to said driven jaw clutch member, said spring pressed balls being releasably retainingly engaged within said annular groove of the driven jaw clutch member during the initial forward clutching movement of said driven jaw clutch member to cause frictional engagement of said friction clutch members and facilitate engagement of said jaw clutch member prior to final engagement of said main clutch.

3. A transmission assembly comprising a main clutch provided with an operating lever, a transmission unit controlled by said main clutch and including a housing and an output shaft, an auxiliary clutch housing mounted on the rear end of said transmission unit housing and into which said output shaft projects, said output shaft having a driving jaw clutch member at its rear end, a second output shaft alined with said first output shaft, a cone friction clutch member rotatable with said first output shaft, a sleeve-like driven jaw clutch member splined to said second output shaft to coact with said driving jaw clutch member, said driven jaw clutch member having longitudinal slots therein with enlargements at their front ends, a driven friction clutch member coacting with said driving cone clutch member, a carrier sleeve for said driven friction clutch member slidable upon said driven jaw clutch member and provided with pins engaging said slots in said driven jaw clutch member, a yieldable detent on said carrier sleeve releasably lockingly engaging said jaw clutch member when it is in retracted position, said enlargements of said slots permitting limited rotative movement of said carrier sleeve when the driven jaw clutch member is in its retracted position, a shifting means for said driven jaw clutch member including a rockshaft provided with an arm, and a link connected to said lever having a spring thrust connection to said arm to retract said driven jaw clutch member and a positive connection to said arm to engage said jaw clutch member, said detent releasably lockingly connecting said jaw clutch member to said carrier sleeve during the initial forward clutching movement of said driven jaw clutch member to cause frictional engagement of the friction clutch members and facilitate engagement of said jaw clutch members prior to engagement of the main clutch.

4. A transmission assembly comprising a main clutch provided with an operating lever, a transmission unit controlled by said main clutch and including a housing and an output shaft, an auxiliary clutch housing mounted on the rear end of said transmission unit housing and into which said output shaft projects, said output shaft having a driving jaw clutch member at its rear end, a second output shaft alined with said first output shaft, a cone friction clutch member rotatable with said first output shaft, a sleeve-like driven jaw clutch member splined to said second output shaft to coact with said driving jaw clutch member, said driven jaw clutch member having longitudinal slots therein with enlargements at their front ends, a driven friction clutch member coacting with said cone friction clutch member, a carrier sleeve for said driven friction clutch member slidable upon said driven jaw clutch member and provided with pins engaging said slots in said driven jaw clutch member, a yieldable detent on said carrier sleeve releasably lockingly engaging said driven jaw clutch member when it is in retracted position, said enlargements of said slots permitting limited movement of said carrier sleeve when the driven jaw clutch member is in its retracted position, a yielding operating connection for said operating lever to said driven jaw clutch member for retracting said driven jaw clutch member and a positive operating connection for said operating lever to engage said jaw clutch members, said detent releasably lockingly connecting said jaw clutch member to said carrier sleeve during the initial forward clutching movement of said driven jaw clutch member to cause frictional engagement of the friction clutch members and facilitate engagement of the jaw clutch members prior to engagement of the main clutch.

5. A transmission assembly comprising a main clutch provided with an operating lever, a transmission unit operatively associated with said main clutch to be controlled thereby, said transmission unit including a housing and an output shaft, an auxiliary clutch housing mounted on the rear end of said transmission housing and into which said output shaft projects, a driving friction clutch member having driving engagement with said output shaft, said output shaft having a driving jaw clutch member at its rear end, a second output shaft, a driven jaw clutch member axially slidable on said second output shaft to coact with said driving jaw clutch member, a driven friction clutch member slidably mounted on said driven jaw clutch member and having limited rotative movement relative thereto, detents carried by said driven friction clutch member yieldably releasably lockingly engaging said driven jaw clutch member when it is in its disengaged position, shifting means for said driven jaw clutch member, and operating connections between said operating lever to said shifting means including a spring arranged to store power during disengagement of said main clutch in the event the load upon the jaw clutch members is such as to prevent disengagement thereof prior to the full disengagement of the main clutch, the loaded spring then acting to disengage the jaw clutch members, and a positive connection for engaging said jaw clutch members, said detents releasably lockingly connecting said driven friction clutch member to said driven jaw clutch member during the initial forward clutching movement of said driven jaw clutch member to cause frictional engagement of the friction clutch members and facilitate engagement of the jaw clutch members prior to final engagement of the main clutch.

6. A transmission assembly comprising a main clutch provided with an operating means, a transmission unit operatively associated with said main clutch to be controlled thereby, said transmission unit including a housing and an output shaft, an auxiliary clutch housing mounted on the rear end of said transmission housing and into which said output shaft projects, a driving friction clutch member having driving engagement with said output shaft, said output shaft having a driving jaw clutch member at its rear end, a second output shaft, a driven jaw clutch member axially slidable on said second output shaft to coact with said driving jaw clutch member, a driven friction clutch member slidably mounted on said driven jaw clutch member and having limited rotative movement relative thereto, detents carried by said driven friction clutch member yieldably releasably lockingly engaging said driven jaw clutch member when it is in its disengaged position, shifting means for said driven jaw clutch member, yieldable operating connections from said operating means to said shifting means for disengaging said jaw clutch members, and a positive operating connection between said operating means and shifting means for engaging said jaw clutch members, said detent releasably lockingly connecting said driven friction clutch member to said driven jaw clutch member during the initial forward clutching movement of said driven jaw clutch member to cause frictional engagement of said friction clutch members and facilitate engagement of the jaw clutch members prior to final engagement of the main clutch.

7. A transmission assembly comprising a main clutch and operating means, a transmission unit operatively associated with said main clutch, said transmission unit including an output shaft provided with a driving jaw clutch member and a driving friction clutch member, a second output shaft, a shiftable driven jaw clutch member on said second output shaft coacting with said driving jaw clutch member, a driven friction clutch member associated with said driven jaw clutch member for limited axial and rotative movement relative thereto, a yieldable releasable locking connection between said driven jaw clutch member and said driven frictional clutch member for releasably locking said driven friction clutch member when the driven jaw clutch member is in a retracted disengaging position and during the initial movement of said last named clutch member into clutch engaging position, operating connections for said operating means to said driven jaw clutch member including a spring arranged to store power during disengagement of same main clutch in the event the load upon the jaw clutch members is such as to prevent disengagement thereof prior to the full disengagement of the main clutch, the loaded spring then acting to disengage the jaw clutch members, and a positive operating connection between said operating means and said driven jaw clutch member to engage said jaw clutch members prior to engagement of said main clutch.

8. A transmission assembly comprising a main clutch and operating means, a transmission unit operatively associated with said main clutch, said transmission unit including an output shaft provided with a driving jaw clutch member and a driving friction clutch member, a shiftable driven jaw clutch member coacting with said driving jaw clutch member, a driven friction clutch member associated with said driven jaw clutch member for limited axial and rotative movement relative thereto, a spring pressed detent connection between said driven jaw and friction clutch members for releasably lockingly connecting the same when the driven jaw clutch member is in retracted position, operating connections from said operating means to said driven jaw clutch member including a spring arranged to store power during disengagement of said main clutch in the event the load upon the jaw clutch members is such as to prevent disengagement thereof prior to the full disengagement of the main clutch, the loaded spring then acting to disengage the jaw clutch members, and a positive operating connection between said operating means and said driven jaw clutch member for engaging said jaw clutch members prior to engagement of said main clutch.

9. The combination of a driving shaft provided with a driving jaw clutch member at its rear end, a driven shaft alined with said driving shaft, a cone friction clutch member rotatable with said driving shaft, a sleeve-like driven jaw clutch member splined to said driven shaft to coact with said driving jaw clutch member, said driven jaw clutch member having longitudinal slots therein with enlargements at their front ends, a driven friction clutch member coacting with said driving friction clutch member, a carrier sleeve for said driven friction clutch member slidable upon said driven jaw clutch member and provided with pins engaging said slots in said driven jaw clutch member, said driven shaft having a peripheral groove into which the inner ends of said pins project, the pins and groove constituting coacting stops limiting the rearward movement of the carrier sleeve, said driven jaw clutch member having an annular groove therein, said carrier sleeve having a plurality of spring pressed balls engaging said groove when the driven jaw clutch member is in retracted position, said enlargements of said slots permitting limited rotative movement of said carrier sleeve when the driven jaw clutch member is in its retracted position, and means for shifting said driven jaw clutch member.

10. The combination of a driving shaft provided with a driving jaw clutch member at its rear end, a driven shaft alined with said driving shaft, a driving friction clutch member rotatable with said driving shaft, a sleeve-like driven jaw clutch member splined to said driven shaft to coact with said driving jaw clutch member, said driven jaw clutch member having longitudinal slots therein with enlargements at their front ends, a driven friction clutch member coacting with said driving friction clutch member, a carrier sleeve for said driven friction clutch member slidable upon said driven jaw clutch member and provided with pins engaging said slots in said driven jaw clutch member, said carrier sleeve having a yieldable detent releasably lockingly engaging said driven jaw clutch member when in its retracted position, said enlargements of said slots permitting limited rotative movement of said carrier sleeve when the driven jaw clutch member is in its retracted position, and means for shifting said driven jaw clutch member.

THOMAS BACKUS.

REFERENCES CITED

The following references are of record in the file of this patent:

UNITED STATES PATENTS

| Number | Name | Date |
|---|---|---|
| 1,396,074 | Stumpenhorst | Nov. 8, 1921 |
| 1,531,158 | Thorington | Mar. 24, 1925 |
| 1,600,490 | Schmidt | Sept. 21, 1926 |
| 1,727,118 | Stumpenhorst | Sept. 3, 1929 |
| 1,746,765 | Carhart | Feb. 11, 1930 |
| 1,752,062 | Carhart | Mar. 25, 1930 |
| 1,836,773 | Salerni | Dec. 15, 1931 |
| 1,973,807 | Grinham et al. | Sept. 18, 1934 |
| 2,102,755 | Sinclair | Dec. 21, 1937 |
| 2,131,201 | Tyler | Sept. 27, 1938 |
| 2,150,468 | Thompson | Mar. 14, 1939 |
| 2,238,370 | Peterson | Apr. 15, 1941 |
| 2,319,784 | Backus | May 25, 1943 |
| 2,376,512 | Schotz | May 22, 1945 |